US008115843B2

(12) United States Patent  
Shigeta et al.

(10) Patent No.: US 8,115,843 B2
(45) Date of Patent: Feb. 14, 2012

(54) PHOTOGRAPHING APPARATUS WITH RANDOM TRIGGER OPERATION

(75) Inventors: Yuji Shigeta, Osaka (JP); Yasutoshi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 861 days.

(21) Appl. No.: 11/574,295

(22) PCT Filed: Aug. 24, 2005

(86) PCT No.: PCT/JP2005/015370
§ 371 (c)(1),
(2), (4) Date: Feb. 26, 2007

(87) PCT Pub. No.: WO2006/022305
PCT Pub. Date: Mar. 2, 2006

(65) Prior Publication Data
US 2007/0291132 A1 Dec. 20, 2007

(30) Foreign Application Priority Data
Aug. 26, 2004 (JP) .................. 2004-246709

(51) Int. Cl.
*H04N 3/14* (2006.01)
*H04N 5/238* (2006.01)
*H04N 5/228* (2006.01)
(52) U.S. Cl. .............. 348/296; 348/222.1; 348/367
(58) Field of Classification Search .......... 348/363, 348/364, 367, 295–296
See application file for complete search history.

(56) References Cited

U.S. PATENT DOCUMENTS
4,984,002 A * 1/1991 Kokubo .............. 348/296
6,700,610 B1 * 3/2004 Kijima et al. ........... 348/296
(Continued)

FOREIGN PATENT DOCUMENTS
JP 8-98093 4/1996
(Continued)

OTHER PUBLICATIONS
International Search Report from the corresponding PCT/JP2005/015370, mailed Dec. 13, 2005.

*Primary Examiner* — David Ometz
*Assistant Examiner* — Carramah J Quiett
(74) *Attorney, Agent, or Firm* — Hamre, Schumann, Mueller & Larson, P.C.

(57) ABSTRACT

A photographing apparatus includes: a synchronizing signal generation portion (6); an imaging portion (1) that is operated based on a synchronizing signal to pick up an image and generate image data; a trigger input portion (18) operable to input a trigger signal for commanding a start of a photographing operation; and a control portion (5) that controls the operation of the imaging portion based on the synchronizing signal and the trigger signal. The control portion controls synchronous processing that is performed in synchronization with the synchronizing signal to pickup a moving image. When the trigger signal is input, the control portion immediately stops the generation of the synchronizing signal by the synchronizing signal generation portion when the synchronous processing is not being performed, while the control portion initializes the synchronous processing and then stops the generation of the synchronizing signal when the synchronous processing is being performed. Thereafter, the control portion resumes the generation of the synchronizing signal, and starts imaging for recording by the imaging portion. A time period between the generation of the trigger signal and the start of imaging is reduced, and a large variation therein is suppressed regardless of the state of the synchronous processing.

5 Claims, 9 Drawing Sheets

U.S. PATENT DOCUMENTS

| | | | |
|---|---|---|---|
| 6,778,215 B1 * | 8/2004 | Nakashima et al. | 348/314 |
| 7,365,785 B2 * | 4/2008 | Hashimoto et al. | 348/314 |
| 2004/0179109 A1 | 9/2004 | Kurosawa | |
| 2005/0200744 A1 | 9/2005 | Kobayashi | |

FOREIGN PATENT DOCUMENTS

| | | |
|---|---|---|
| JP | 2001-339635 | 12/2001 |
| JP | 2002-199288 | 7/2002 |
| JP | 2004-72374 | 3/2004 |

* cited by examiner

PHOTOGRAPHING APPARATUS WITH RANDOM TRIGGER OPERATION

TECHNICAL FIELD

The present invention relates to a photographing apparatus having a mechanical shutter function or an electronic shutter function, and particularly to a photographing apparatus that performs an exposure operation when a trigger is input externally at random.

Some conventional photographing apparatuses such as a digital still camera have a function of performing an exposure operation by a trigger input to a solid-state imaging device at random (hereinafter, referred to as a "random trigger shutter operation").

Figure 8:
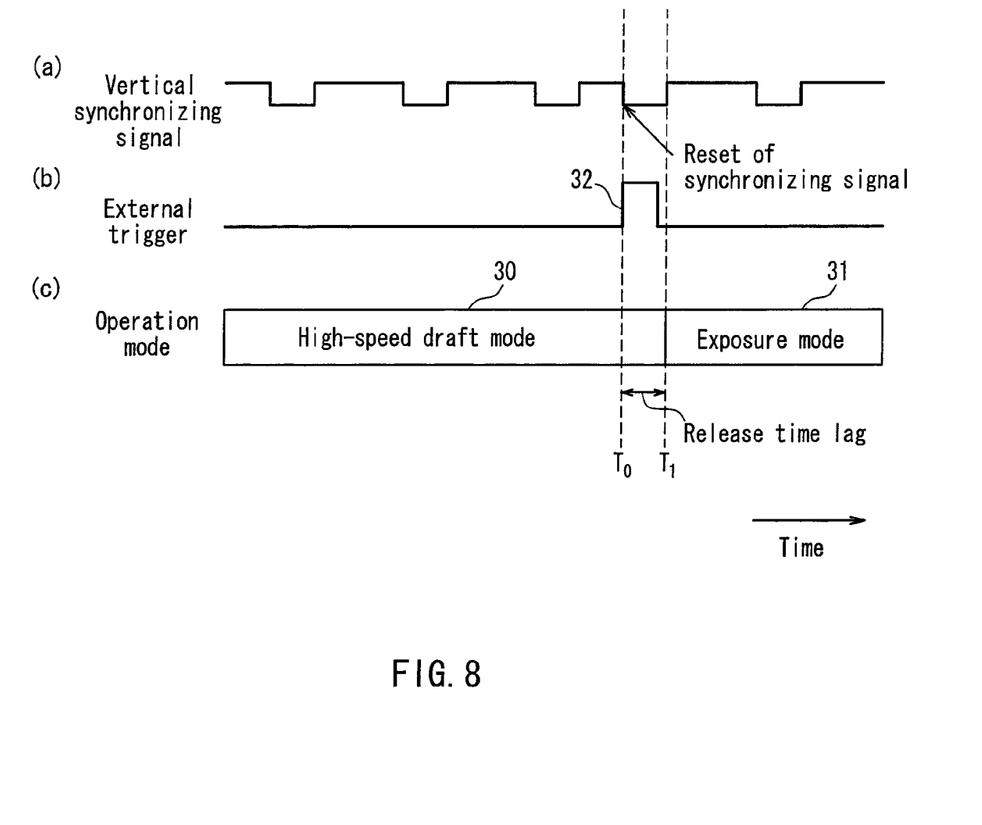
FIG. 8 is a timing chart showing an operation of a photographing apparatus according to a conventional example.

FIG. 8 is a timing chart for explaining a random trigger shutter operation disclosed in Patent Document 1. In the figure, (c) represents an operation mode of a solid-state imaging device, which is shifted from a high-speed draft mode 30 to an exposure mode 31. In the high-speed draft mode 30, an image being picked up is displayed on a liquid crystal monitor screen as a through image. In the exposure mode 31, an exposure operation is performed. In response to the input of an external trigger 32 shown in (b), the operation mode is shifted from the high-speed draft mode 30 to the exposure mode 31. In the figure, (a) represents a vertical synchronizing signal as a driving timing of the imaging device.

During the operation in the high-speed draft mode 30, when the input of the external trigger 32 is detected as interruption processing at a time T0, the vertical synchronizing signal is reset as shown in (a). Then, at a time T1, the operation mode is shifted to the exposure mode 31, and photographing processing is started. In the following description, a time period between the time T0 at which the external trigger 32 is input and the time T1 at which the operation mode is shifted to the exposure mode 31 is referred to as a release time lag. In this conventional example, the vertical synchronizing signal is reset in response to the input of the external trigger 32, whereby the release time lag is reduced.

Figure 9:
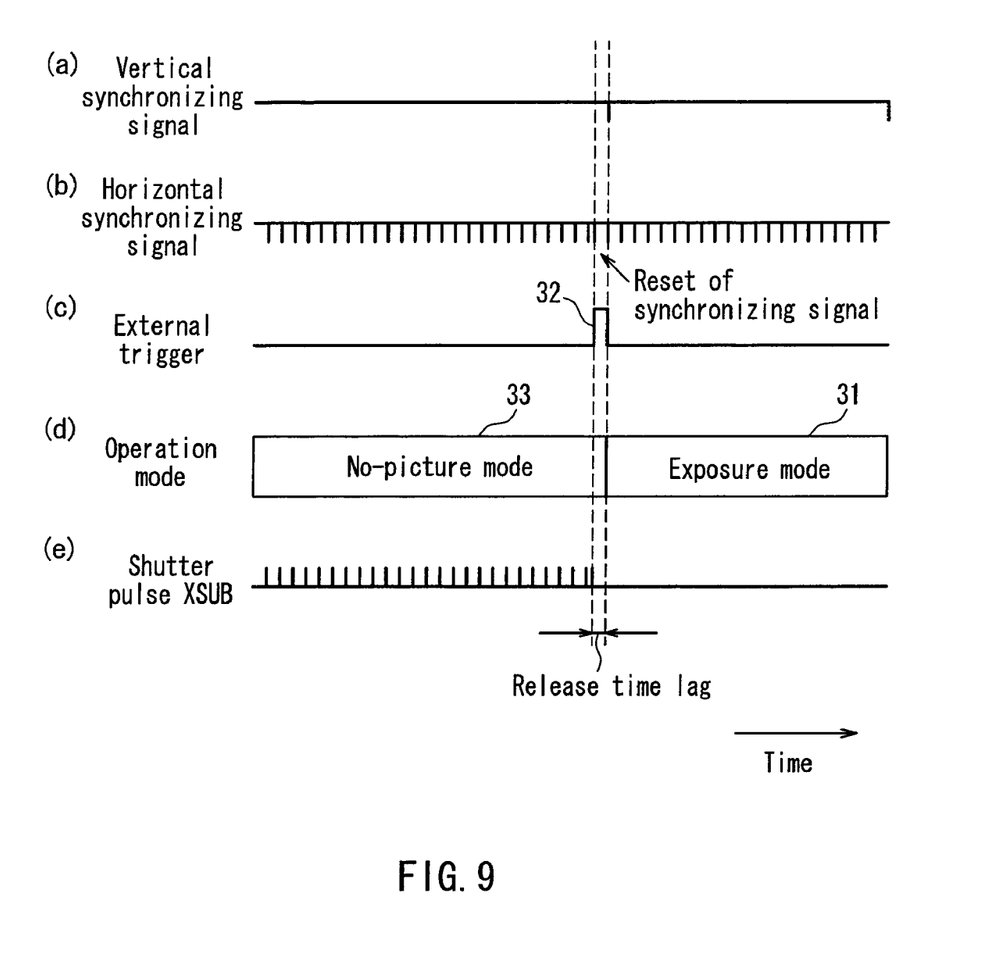
FIG. 9 is a timing chart showing an operation of a photographing apparatus according to another conventional example.

FIG. 9 is a timing chart for explaining a random trigger shutter operation disclosed in Patent Document 2 as another conventional example. In the figure, (d) represents an operation mode that is shifted in a state in which the random trigger shutter operation can be performed. When the setting is such that the random trigger shutter operation can be performed, the operation mode is initially a no-picture mode 33, in which a vertical synchronizing signal (a) is stopped and accordingly a charge read-out signal (not shown) for reading out the input of an imaging device also is stopped until an external trigger 32 shown in (c) is input.

When the external trigger 32 is input, the vertical synchronizing signal (a) is resumed at an input timing thereof, and a horizontal synchronizing signal (b) is reset. When the horizontal synchronizing signal (b) is reset, a shutter pulse XSUB (e) as a signal for clearing the imaging device, which is generated in synchronization with the horizontal synchronizing signal, also is reset at the same timing as that of the horizontal synchronizing signal. Accordingly, the shutter pulse XSUB is generated at the same timing as the input timing of the external trigger 32. In other words, an exposure mode 31 is started when the external trigger 32 is input, and thus a release time lag is reduced.

Patent Document 1: JP 2004-072374 A
Patent Document 2: JP 8(1996)-98093 A

DISCLOSURE OF INVENTION

Problem to be Solved by the Invention

However, in the conventional example described in Patent Document 1, when the input timing of the external trigger (b) overlaps an operation period of the vertical synchronizing signal (a), the vertical synchronizing signal may result in multiple interruption when the vertical synchronizing signal is received as an interruptive factor so as to be processed by vertical synchronizing signal interruption processing. Thus, in a system that does not allow for multiple interruption, it takes longer to shift to the photographing processing by the length of the operation period of the vertical synchronizing signal. Further, even in a system that allows for multiple interruption, processing that was supposed to be performed in the vertical synchronizing signal interruption processing is executed after interruption processing due to the external trigger. As a result, it also takes a while to shift to the photographing processing.

On the other hand, in the conventional example described in Patent Document 2, in the state in which the random trigger shutter operation can be performed, the vertical synchronizing signal is stopped and the charge read-out pulse also is stopped, and thus there is no influence of processing in synchronization with the vertical synchronizing signal. However, there is no setting for a high-speed draft mode, and thus an image to be photographed cannot be confirmed until the external trigger is input. Further, in the case where the entire system performs processing in synchronization with the vertical synchronizing signal, an operation sequence has to be changed so as to perform the random trigger shutter operation.

It is an object of the present invention to provide a photographing apparatus that reduces a release time lag sufficiently for practical purpose and suppresses a large variation in the length of the release time lag regardless of the state of synchronous processing.

Means for Solving Problem

A photographing apparatus according to a first configuration of the present invention includes: a synchronizing signal generation portion that outputs a synchronizing signal periodically; an imaging portion that is operated based on the synchronizing signal to pick up a subject image and generate image data; a trigger input portion operable to input a trigger signal commanding a start of a photographing operation by the imaging portion; and a control portion that controls the operation of the imaging portion based on the synchronizing signal and the trigger signal. The control portion controls synchronous processing that is performed in synchronization with the synchronizing signal to pickup a moving image. When the trigger signal is input, the control portion immediately stops the generation of the synchronizing signal by the synchronizing signal generation portion in a case where the synchronous processing is not being performed, while the control portion initializes the synchronous processing and then stops the generation of the synchronizing signal in a case where the synchronous processing is being performed. Thereafter, the control portion resumes the generation of the synchronizing signal by the synchronizing signal generation portion, and starts imaging for recording by the imaging portion.

A photographing apparatus according to a second configuration of the present invention includes: a synchronizing signal generation portion that outputs a synchronizing signal periodically; an imaging portion that is operated based on the synchronizing signal to pick up a subject image and generate image data; a trigger input portion operable to input a trigger signal for commanding a start of a photographing operation by the imaging portion and an auxiliary trigger signal preceding the trigger signal; and a control portion that controls the operation of the imaging portion based on the synchronizing signal and the trigger signal. The control portion is configured to control synchronous processing that is performed in synchronization with the synchronizing signal to pickup a moving image, and photographing pre-processing that is performed in accordance with the auxiliary trigger signal to pick up a still image by the imaging portion. When the control portion waits for the input of the trigger signal after the photographing pre-processing is terminated, the control portion makes an operation period of the synchronous processing shorter than an operation period of the synchronous processing when the photographing pre-processing is not terminated. The control portion performs control so that the imaging portion starts imaging for recording when the trigger signal is input from the trigger input portion.

Effects of the Invention

According to the photographing apparatus having the first configuration of the present invention, even when the synchronous processing is performed at the time when the trigger signal is input, the synchronizing signal is stopped immediately, and the synchronous processing is terminated at the same time, whereby processing in preparation for photographing can be started. In addition, after the processing in preparation for photographing, it is possible to start photographing processing without executing the remaining synchronous processing. Therefore, a release time lag can be reduced sufficiently for practical purpose regardless of the state of the synchronous processing.

According to the photographing apparatus having the second configuration of the present invention, during an operation in a high-speed draft mode in which the trigger signal is likely to be input, the operation period of the synchronous processing is reduced, so that the probability of overlap between the operation period and a timing of the trigger signal is reduced. Consequently, a large variation in the length of the release time lag can be suppressed.

EXPLANATION OF LETTERS OR NUMERALS

1 CCD image sensor
2 Image processor
3 Buffer memory
4 Liquid crystal monitor
5 Controller
6 Timing generator
7 CCD driver
8 Objective lens
9 OIS (Optical image stabilizer) lens
10 Diaphragm
11 Focus adjusting lens
12 Zoom motor
13 OIS actuator
14 Focus motor
15 Strobe
16 Memory slot
17 Memory card
18 Shutter button
20 Half shutter trigger
21 Full shutter trigger
22 High-speed draft mode
23 Exposure mode
24 Frame read-out mode
30 High-speed draft mode
31 Exposure mode
32 External trigger
33 No-picture mode

DESCRIPTION OF THE INVENTION

In the photographing apparatus according to the first configuration of the present invention, it is preferable that the trigger input portion is operable to input an auxiliary trigger signal preceding the trigger signal, and the control portion controls photographing pre-processing in accordance with the auxiliary trigger signal to pick up a still image by the imaging portion, so that when the control portion waits for the input of the trigger signal after the photographing pre-processing is terminated, the control portion makes an operation period of the synchronous processing shorter than an operation period of the synchronous processing when the photographing pre-processing is not terminated.

In the photographing apparatus according to any one of the configurations of the present invention, it is preferable that in a case where the photographing pre-processing is not terminated when the trigger signal is input, the control portion performs control so that the generation of the synchronizing signal is stopped after waiting for the end of the photographing pre-processing. Thereby, when the trigger signal is input at a time when a time period for over 1 cycle of the synchronizing signal is necessary, such as a time when an auto focus is performed, so as to perform the photographing pre-processing, the control portion waits for the end of the photographing pre-processing without stopping the synchronizing signal. Therefore, photographing can be performed without stopping a display of a monitor image.

Hereinafter, embodiments of the present invention will be described in detail with reference to the drawings.

Embodiment 1

A photographing apparatus according to Embodiment 1 of the present invention is configured so that in the case where synchronous processing in synchronization with a synchronizing signal is performed when an external trigger is input, the synchronous processing is initialized, and then an operation of the synchronizing signal is stopped, whereby a release time lag can be reduced sufficiently for practical purpose regardless of the execution state of the synchronous processing.

Figure 1:
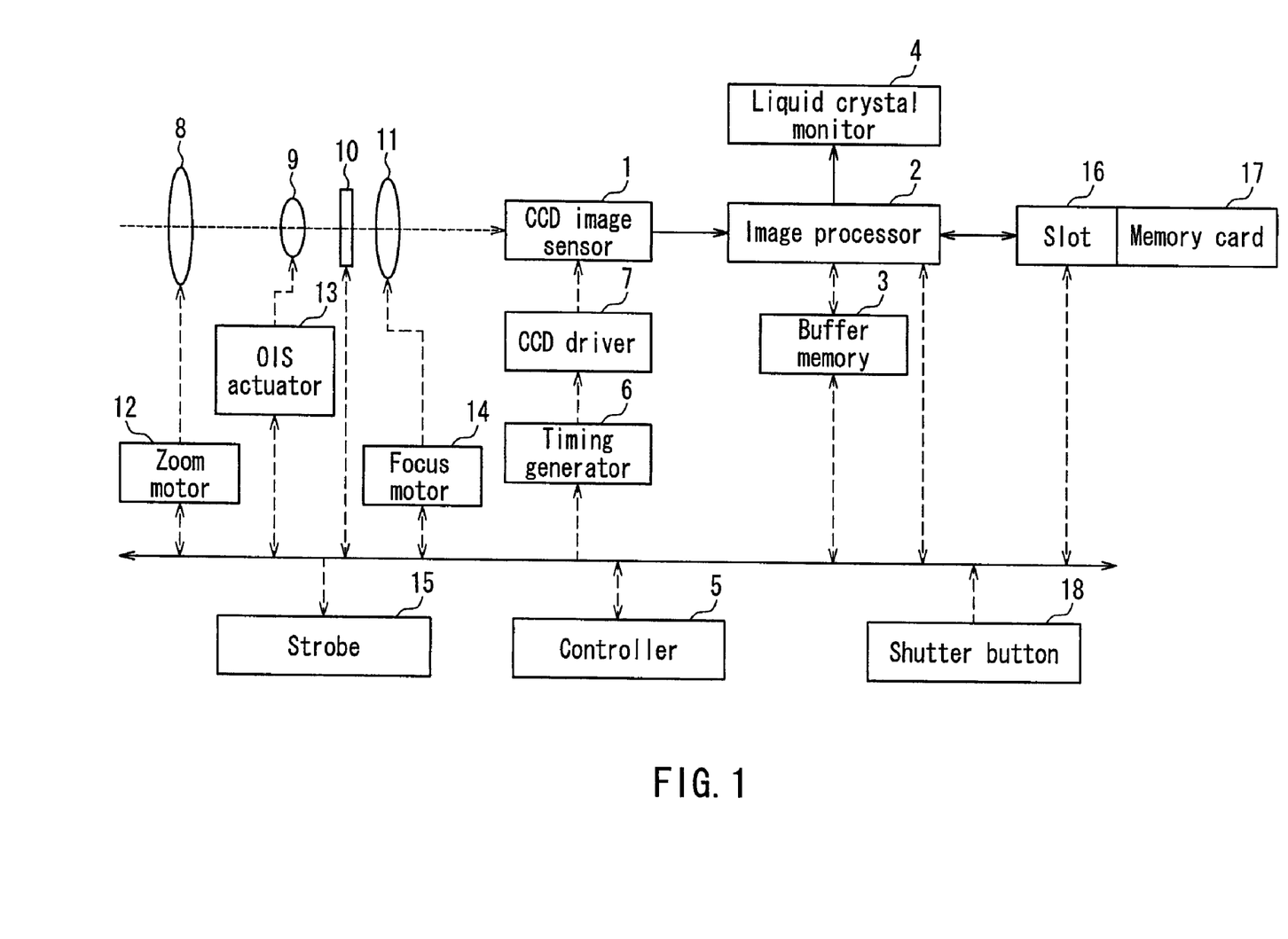
FIG. 1 is a block diagram showing a photographing apparatus according to an embodiment of the present invention.

FIG. 1 is a block diagram showing the configuration of the photographing apparatus according to Embodiment 1 of the present invention. In the figure, solid arrows represent transmission of an image signal, and dashed arrows represent transmission of a control signal. The configuration of the photographing apparatus shown in this block diagram is common to other embodiments.

An image pickup signal output from a CCD image sensor 1 constituting an imaging portion is processed by an image processor 2. The signal processed by the image processor 2 is stored temporarily in a buffer memory 3. Further, based on the signal processed by the image processor 2, an image is displayed on a liquid crystal monitor 4. An operation of the entire photographing apparatus is controlled by a controller 5. As the imaging portion, a CMOS image sensor or the like may be used instead of the CCD image sensor 1.

The CCD image sensor 1 is driven by a CCD driver 7 based on a timing pulse supplied from a timing generator 6 so as to output the image pickup signal. The CCD image sensor 1 receives an optical image through an optical system including an objective lens 8, an OIS (Optical image stabilizer) lens 9, a diaphragm 10, a focus adjusting lens 11, and the like, and performs photoelectric exchange. The objective lens 8, the OIS lens 9, and the focus adjusting lens 11 are driven by a zoom motor 12, an OIS actuator 13, and a focus motor 14, respectively. Along with the optical system, a strobe 15 is provided, which is controlled by the controller 5.

The image processor 2 is configured to subject the image pickup signal at least to the usual image processing, such as pre-processing, YC processing, scaling processing, and compression encoding, so as to generate image data. The image processor 2 is connected with a memory slot 16, in which a memory card 17 is inserted so that the image-processed data can be recorded therein. A shutter button 18 is configured so that an external trigger that commands photographing via the controller 5 is input. The shutter button 18 is an example of a device for inputting a trigger for starting photographing externally, such as a cable release (remote photograph device) and the like.

The controller 5, which usually is a microcomputer, receives the input of the external trigger and a synchronizing signal as interruption, and controls the overall photographing operation. The timing generator 6 outputs to the CCD driver 7 and the image processor 2 a synchronizing signal that has its operation period and operation interval changed by a control instruction transmitted from the controller 5. The CCD driver 7 outputs the signal for driving the CCD image sensor 1 by the synchronizing signal input from the timing generator 6.

A random trigger shutter operation of the photographing apparatus according to the present embodiment will be described with reference to a timing chart in FIG. 2.

Figure 2:
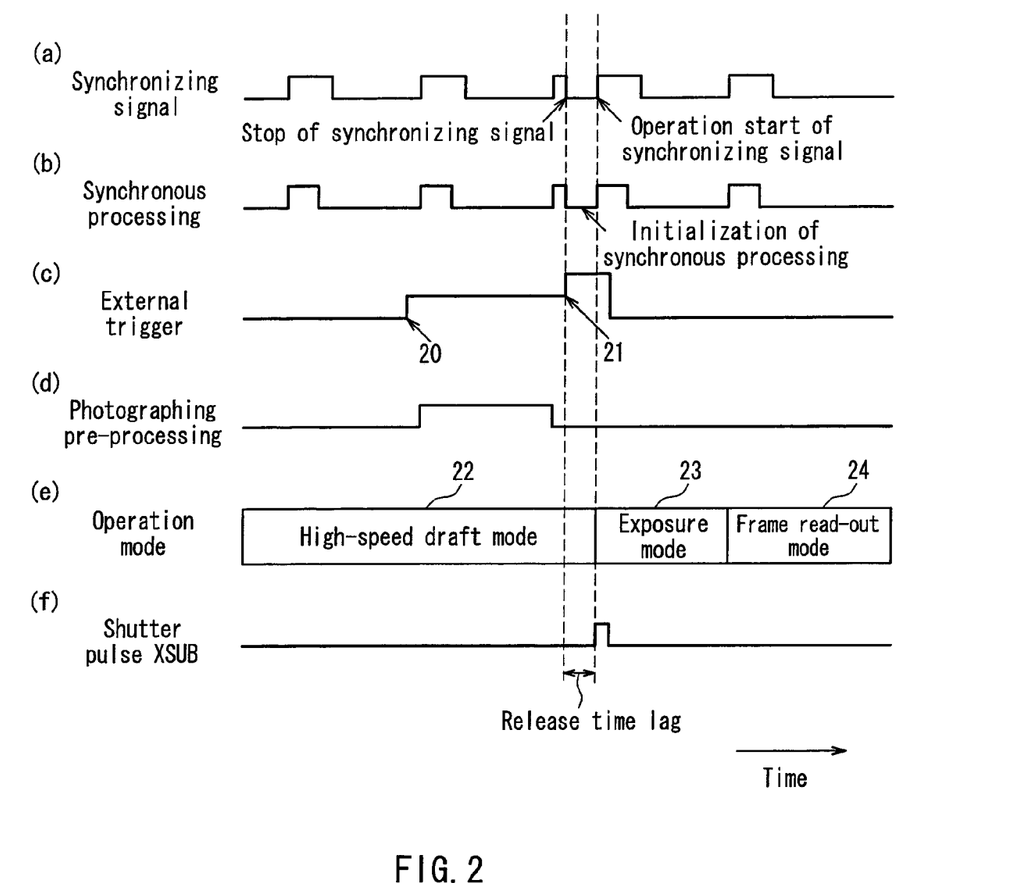
FIG. 2 is a timing chart showing an operation of a photographing apparatus according to Embodiment 1 of the present invention.

In FIG. 2, a synchronizing signal (a) is a signal for determining a driving timing of the CCD image sensor 1. Synchronous processing (b) represents an operation time during which the controller 5 performs synchronous processing. The synchronous processing is performed by the controller 5 for picking up a moving image, which is conducted in synchronization with the synchronizing signal (a). The synchronous processing is mainly arithmetic processing including, for example, the initialization of a parameter of the CCD image sensor 1, the setting of an f number, the setting of an AF desired value, the setting of a control value of the OIS, the initialization (address setting etc.) of the image processor 2, and the like. A moving image to be picked up after the synchronous processing may be that for recording or not that for recording but only for display. The moving image not for recording but only for display is referred to specifically as a through image.

An external trigger (c) is an input signal from the shutter button 18, and includes a state of a half shutter trigger 20 and a subsequent state of a full shutter trigger 21. The half shutter trigger 20 represents a state in which a key is pushed halfway, as a timing for starting photographing pre-processing, and the full shutter trigger 21 represents a state in which the key is pushed deeply, as a timing for starting photographing.

Photographing pre-processing (d) represents an operation time of the photographing pre-processing executed before photographing, such as an auto focus (hereinafter, abbreviated as an AF). The photographing pre-processing is defined to be pre-processing for picking up a still image for recording by the CCD image sensor 1. This pre-processing includes mechanical processing such as, for example, driving of the diaphragm 10, the zoom motor 12, the OIS actuator 13, and the focus motor 14, charging of the strobe, and the like. The pre-processing also includes arithmetic processing such as the setting of an AF desired value for a still image for recording, the setting of an AE desired value, and the like.

An operation mode (e) represents an operation mode of the CCD image sensor 1, and includes the following 3 modes: a high-speed draft mode 22, an exposure mode 23, and a frame read-out mode 24 for outputting accumulated charges for each frame. The exposure mode 23 is a mode for photographing an image for recording. A shutter pulse XSUB (f) is input to the CCD image sensor 1, so that the accumulated charges are discarded and exposure is started to accumulate charges again.

When the operation mode (e) shown in FIG. 2 is the high-speed draft mode 22, the synchronizing signal (a) operates in a constant cycle, and processing in the high-speed draft mode is performed completely in the synchronous processing (b). When the external trigger (c) is input, initially, in the state of the half shutter trigger 20, the photographing pre-processing (d) is performed as well as the processing in the high-speed draft mode in the synchronous processing (b).

After the photographing pre-processing (d), when the full shutter trigger 21 of the external trigger (c) is input to the controller 5 as interruption during the operation period of the synchronous processing (b), the controller 5 initializes values of a flag and a variable in the synchronous processing, terminates the operation compulsively, and then stops the synchronizing signal (a). The controller 5 further makes the setting for photographing processing such as exposure, resumes the synchronizing signal (a), and starts the operation of the synchronous processing (b) and outputs the shutter pulse XSUB (f) at the same time. By the output of the shutter pulse XSUB (f), the operation mode (e) is set to the exposure mode 23, so that the photographing processing is started.

Figure 3:
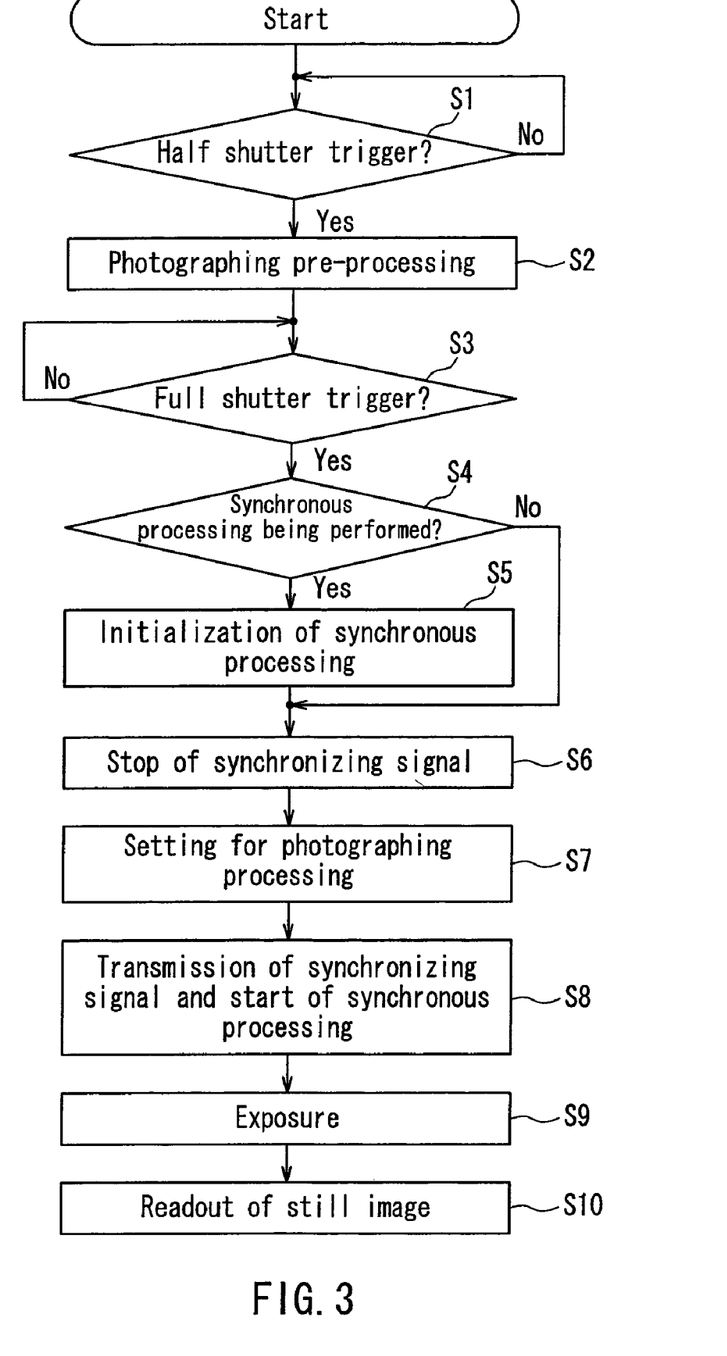
FIG. 3 is a flowchart showing the operation of the photographing apparatus.

The overall flow of the random trigger shutter operation in the photographing apparatus of the present embodiment is shown in a flowchart in FIG. 3. With reference to the timing chart in FIG. 2 and the flowchart in FIG. 3, the random trigger shutter operation of the present embodiment will be described in keeping with the overall flow thereof.

When the half shutter trigger 20 is input during the high-speed draft mode 22 in FIG. 2(e) (Step S1 in FIG. 3), the photographing pre-processing (d) is performed (Step S2).

After the photographing pre-processing, the apparatus is placed in a standby state until the full shutter trigger 21 is output (Step S3).

When the full shutter trigger 21 is output, the controller 5 checks whether the synchronous processing (b) is being performed (Step S4). When the synchronous processing (b) is being performed, the controller 5 rewrites and initializes the values of the flag and the variable in the synchronous processing, and terminates the operation compulsively (Step S5). Then, the controller 5 stops the synchronizing signal (a) (Step S6). When the synchronous processing (b) is not being performed, the controller 5 immediately stops the synchronizing signal (a). Then, the controller 5 makes the setting for the photographing processing such as exposure (Step S7), starts transmission of the synchronizing signal (a), and starts the operation of the synchronous processing (b) (Step S8). Further, the controller 5 outputs the shutter pulse XSUB (D to set the operation mode (e) to the exposure mode, so that the photographing processing is started (Step S9). Thereafter, the controller 5 reads out a still image (Step S10), and starts image processing by the image processor 2.

As described above, in the present embodiment, the synchronizing signal and the synchronous processing are reset upon the input of the external trigger. Therefore, although a time period between the input of the external trigger and the start of photographing is extended by the length of the processing for terminating the synchronous processing in the state in which the synchronous processing is being performed, it is possible to reduce the time period between the input of the external trigger and the start of photographing sufficiently for practical purpose regardless of the execution state of the synchronous processing.

Embodiment 2

A photographing apparatus according to Embodiment 2 of the present invention is configured so that an operation period of synchronous processing is reduced when a half shutter trigger is input and photographing pre-processing is terminated, in other words, in a state in which a full shutter trigger is likely to be input. In this manner, the probability of overlap between the input of an external trigger and the operation period of the synchronous processing is reduced, and accordingly the frequency of need for initializing the synchronous processing is decreased, whereby variations in a time period between the input of the external trigger and the start of photographing are reduced.

Figure 4:
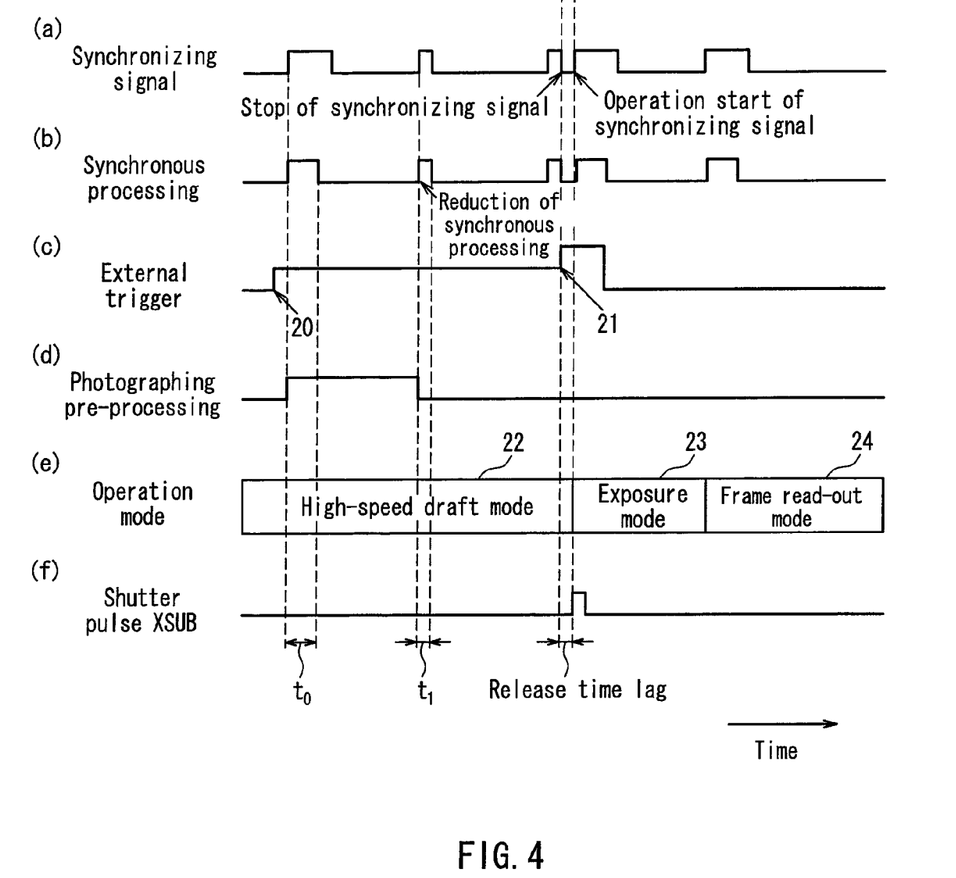
FIG. 4 is a timing chart showing an operation of a photographing apparatus according to Embodiment 2 of the present invention.

FIG. 4 is a timing chart showing a random trigger shutter operation of the photographing apparatus according to the present embodiment. Waveforms (a) to (f) in FIG. 4 represent the same operation timings as those shown by the waveforms (a) to (f), respectively, in FIG. 2, and thus repeated descriptions will be omitted.

The operation of the photographing apparatus according to the present embodiment will be described with reference to FIG. 4. When an operation mode (e) is a high-speed draft mode 22, a synchronizing signal (a) operates in a constant cycle, and processing in the high-speed draft mode is performed thoroughly in synchronous processing (b). When an external trigger (c) is input, initially, in a state of a half shutter trigger 20, photographing pre-processing (d) is performed as well as the processing in the high-speed draft mode in the synchronous processing (b).

After the photographing pre-processing (d), in a state in which the apparatus waits for the input of a full shutter trigger 21 as the external trigger (c), processing contents in the synchronous processing (b) are reduced. For example, the settings of a diaphragm and a focus may be omitted. This is because when those settings have been completed in the photographing preprocessing, it is less likely that they need to be changed in the subsequent synchronous processing. By reducing the processing contents in the synchronous processing (b), an operation period t1 of the synchronous processing (b) after the photographing pre-processing (d) is made shorter than an operation period t0 of the synchronous processing (b) from before the input of the half shutter trigger 20 until the end of the photographing pre-processing (d).

When the full shutter trigger 21 of the external trigger (c) is input to the controller 5 as interruption during the operation period of the synchronous processing (d), the controller 5 initializes the synchronous processing, and stops the synchronizing signal (a). The controller 5 further makes the setting for photographing processing such as exposure, resumes the synchronizing signal (a), and starts the operation of the synchronous processing (b) and outputs a shutter pulse XSUB (f) at the same time. By the output of the shutter pulse XSUB (f), the operation mode (e) is set to an exposure mode 23, so that the photographing processing is started.

Figure 5:
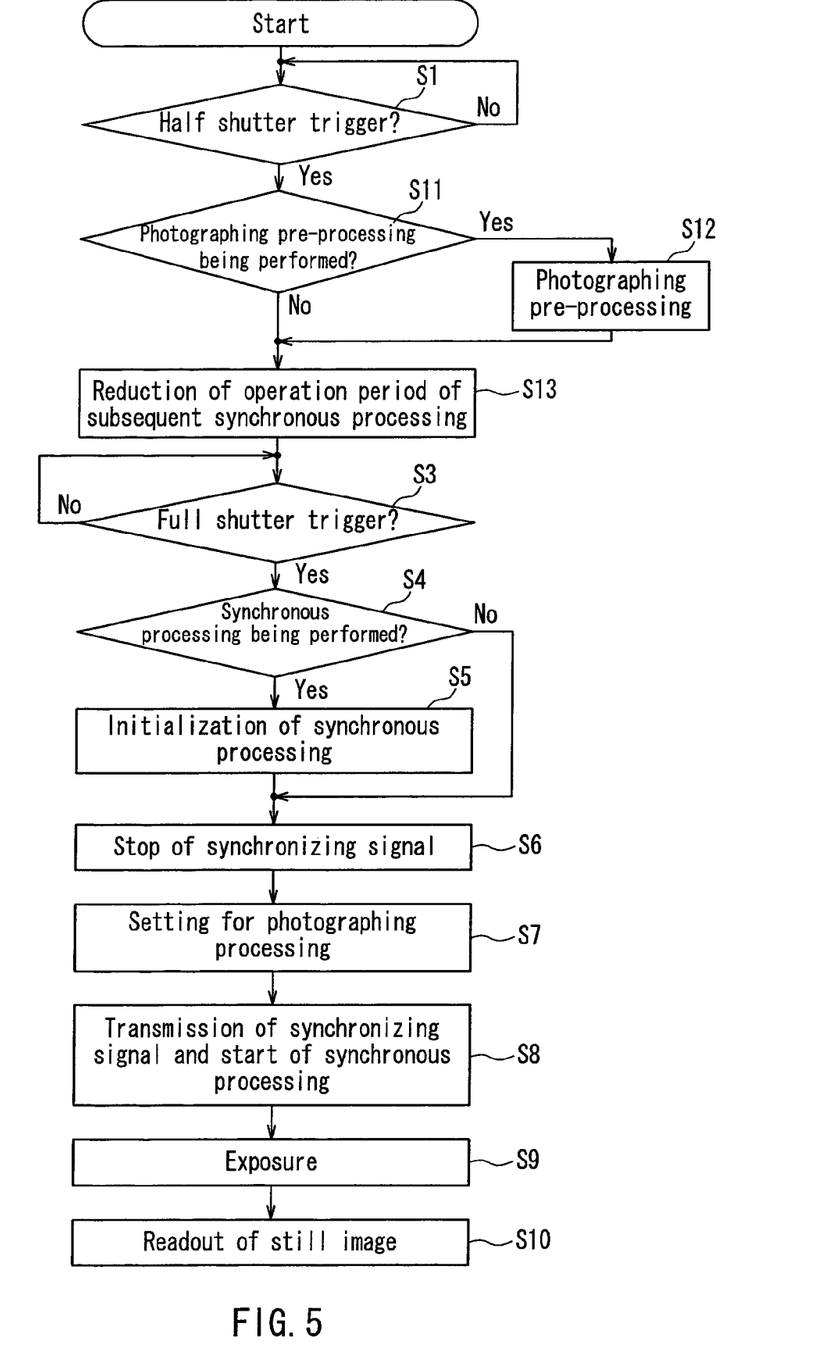
FIG. 5 is a flowchart showing the operation of the photographing apparatus.

FIG. 5 is a flowchart showing the overall flow of the random trigger shutter operation in the photographing apparatus of the present embodiment. With reference to the timing chart in FIG. 4 and the flowchart in FIG. 5, the random trigger shutter operation of the present embodiment will be described in keeping with the overall flow thereof. The same steps as those in the flowchart in FIG. 3 showing the operation in Embodiment 1 are denoted with the same reference numerals, and repeated descriptions will be omitted.

When the half shutter trigger 20 is input in the high-speed draft mode 22 in FIG. 4 (e) (Step S1 in FIG. 5), the photographing pre-processing (d) is started. After the start of the photographing pre-processing (d), when the synchronizing signal (a) is input, it is determined whether the photographing pre-processing is being performed or not (Step S11). If the photographing pre-processing is being performed, it is to be completed (Step S12). If the photographing pre-processing is not being performed, immediately, an operation period of the subsequent synchronous processing (b) is reduced (Step S13). Thereafter, the apparatus is placed in a standby state until the full shutter trigger 21 is output (Step S3). The subsequent operations are the same as those in Embodiment 1 shown in FIG. 3.

As described above, in the present embodiment, Step 11 for determining whether the photographing pre-processing is terminated is provided after the input of the half shutter trigger. Thus, when the half shutter trigger is input, and the photographing pre-processing is terminated, in other words, when the full shutter trigger is likely to be input, Step S13 for reducing the operation period of the synchronous processing is executed. Consequently, the probability of input of the full shutter trigger during the synchronous processing is reduced, and accordingly the frequency of initialization of the synchronous processing is decreased, whereby variations in the time period between the input of the external trigger and the start of photographing can be reduced.

Embodiment 3

A photographing apparatus according to Embodiment 3 of the present invention is configured so that when an external trigger is input at a time when photographing pre-processing needs to be performed for 1 or more cycles of a synchronizing signal, such as a time when an AF is performed, so as to perform photographing processing, processing in a high-speed draft mode is executed until the photographing preprocessing is terminated without immediately stopping the synchronizing signal, and the operation of the synchronizing signal is stopped when the photographing pre-processing is terminated. Consequently, even when the external trigger is input, a CCD image sensor 1 can be operated in the high-speed draft mode during the wait for the end of the photographing pre-processing, and therefore photographing can be performed without stopping a display on a liquid crystal monitor screen.

Figure 6:
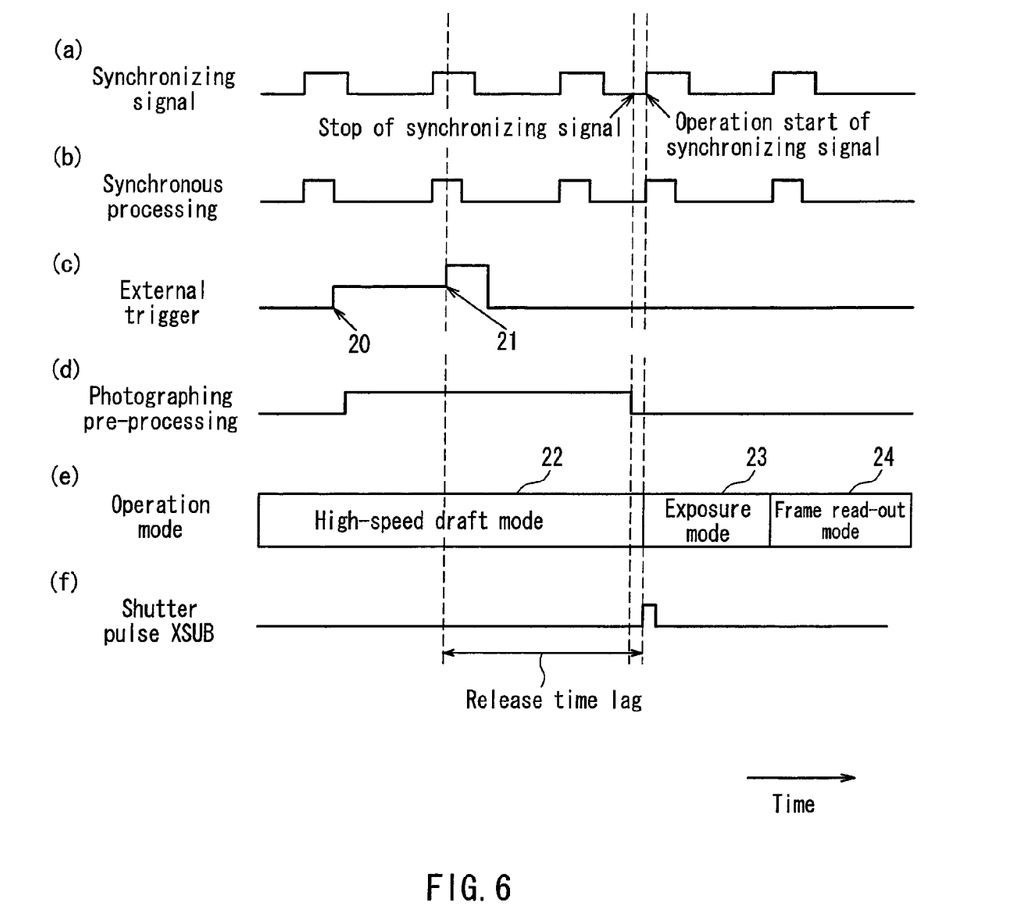
FIG. 6 is a timing chart showing an operation of a photographing apparatus according to Embodiment 3 of the present invention.

FIG. 6 is a timing chart showing a random trigger shutter operation of the photographing apparatus according to the present embodiment. Waveforms (a) to (f) in FIG. 6 represent the same operation timings as those shown by the waveforms (a) to (f), respectively, in FIG. 2, and thus repeated descriptions will be omitted.

The operation of the photographing apparatus according to the present embodiment will be described with reference to FIG. 6. In a state in which an operation mode (e) is a high-speed draft mode 22, a synchronizing signal (a) operates in a constant cycle, and processing in the high-speed draft mode is performed thoroughly in synchronous processing (b). When an external trigger (c) is input, initially, in a state of a half shutter trigger 20, the processing in the high-speed draft mode, which is conducted as the synchronous processing, and photographing pre-processing are performed in parallel.

When a full shutter trigger 21 is input to a controller 5 as interruption at a time when the photographing pre-processing (d) needs to be performed for 1 or more cycles of the synchronizing signal (a) by the end of its operation, the controller 5 waits for the end of the photographing pre-processing (d). When detecting the end of the photographing pre-processing (d), the controller 5 immediately initializes the synchronous processing (b), and stops the synchronizing signal (a). Then, the controller 5 makes the setting for preparation for exposure, and operates the synchronizing signal (a) and outputs a shutter pulse XSUB (f) at the same time. By the output of the shutter pulse XSUB (f), the operation mode (e) is set to an exposure mode 23, so that photographing processing is started.

Figure 7:
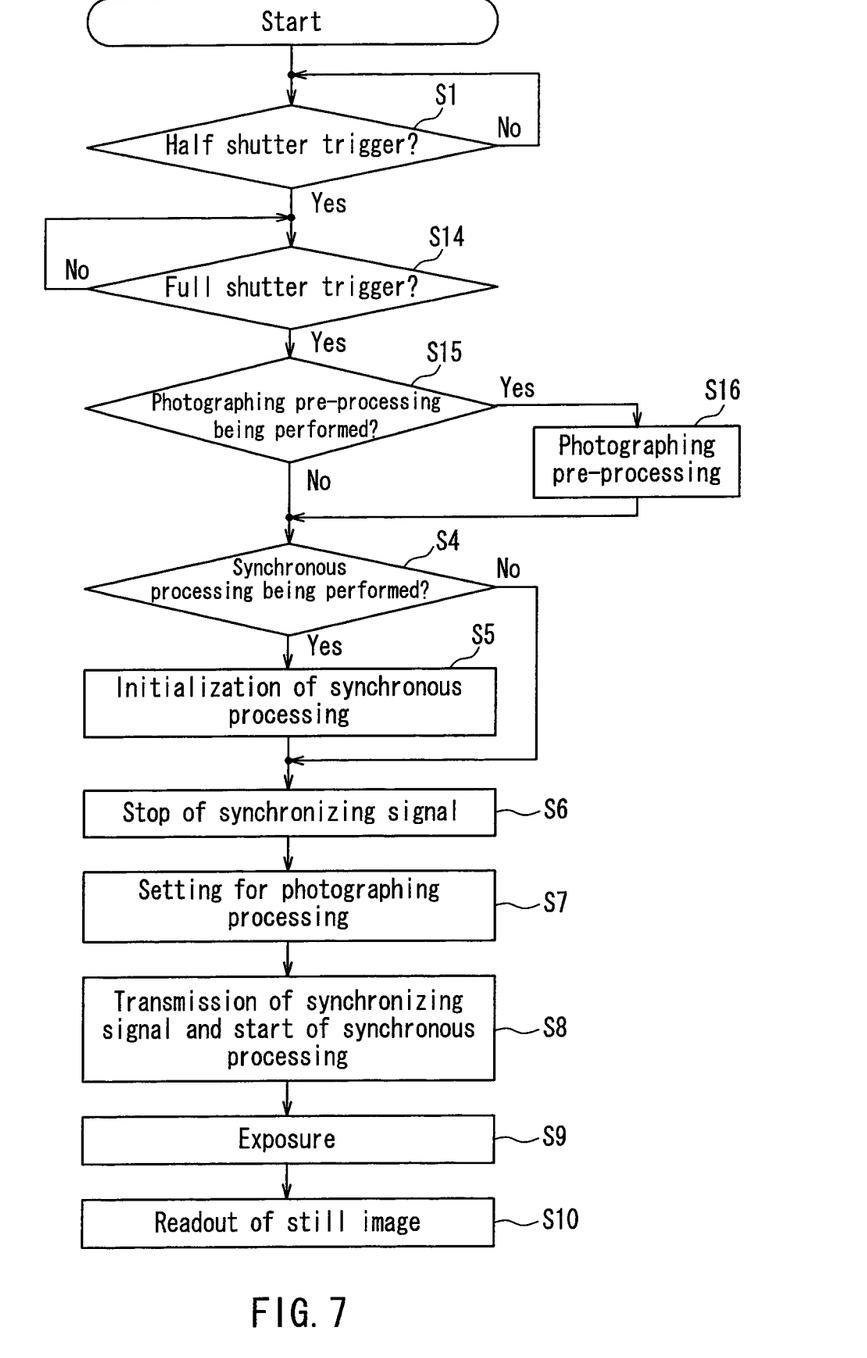
FIG. 7 is a flowchart showing the operation of the photographing apparatus.

FIG. 7 is a flowchart showing the overall flow of the random trigger shutter operation in the photographing apparatus of the present embodiment. With reference to the timing chart in FIG. 6 and the flowchart in FIG. 7, the random trigger shutter operation of the present embodiment will be described in keeping with the overall flow thereof. The same steps as those in the flowchart in FIG. 3 showing the operation in Embodiment 1 are denoted with the same reference numerals, and repeated descriptions will be omitted.

When the half shutter trigger 20 is input in the high-speed draft mode 22 in FIG. 6(e) (Step S1 in FIG. 7), and the full shutter trigger 21 is input further (Step S14), it is determined whether the photographing pre-processing (d) is being performed or not (Step S15). When the photographing pre-processing is being performed, it is to be completed (Step S16). When the photographing pre-processing is not being performed, immediately, the controller 5 checks whether the synchronous processing (b) is being performed (Step S4). When the synchronous processing (b) is being performed, the controller 5 rewrites and initializes values of a flag and a variable in the synchronous processing, and terminates the operation forcefully (Step S5). Then, the controller 5 stops the synchronizing signal (a) (Step S6). When the synchronous processing (b) is not being performed, the controller 5 immediately stops the synchronizing signal (a) (Step S6). The subsequent operations are the same as those in Embodiment 1 shown in FIG. 3.

As described above, in the present embodiment, Step S15 for determining whether the photographing pre-processing is terminated or not is provided, and when the full shutter trigger 21 is input at a time when the photographing pre-processing needs to be performed for 1 of more cycles of the synchronizing signal, the processing in the high-speed draft mode is executed until the photographing pre-processing is terminated in Step S16 without immediately stopping the synchronizing signal, and the synchronizing signal is reset when the photographing pre-processing is terminated. Therefore, even when the full shutter trigger 21 has been input, photographing can be performed without stopping a display on a liquid crystal monitor screen during the wait for the end of the photographing pre-processing.

INDUSTRIAL APPLICABILITY

According to the present invention, a time period between interruption of an external trigger and actual performance of a photographing operation can be reduced sufficiently for practical purpose, and it is possible to avoid imaging from being started in a state in which focus is not achieved and the like. Therefore, the present invention can be applied to a digital camera, a mobile telephone terminal with a camera, and the like.

The invention claimed is:

1. A photographing apparatus, comprising:
   a synchronizing signal generation portion that outputs a synchronizing signal periodically;
   an optical system;
   an imaging portion that is operated based on the synchronizing signal to pick up a subject image through the optical system and generate image data;
   a trigger input portion operable to input a trigger signal commanding a start of a photographing operation by the imaging portion; and
   a control portion that controls the operation of the imaging portion based on the synchronizing signal and the trigger signal,
   the control portion being configured to control synchronous processing performed in synchronization with the synchronizing signal, which is an arithmetic processing including at least a setting of a parameter of the imaging portion and a setting of the optical system for picking up a moving image, and stop the generation of the synchronizing signal by the synchronizing signal generation portion when the trigger signal is input, and thereafter resume the generation of the synchronizing signal and start imaging for recording by the imaging portion,
   wherein when the trigger signal is input,
   in a case where the synchronous processing is not being performed, the control portion immediately stops the generation of the synchronizing signal by the synchronizing signal generation portion and thereafter resumes the generation of the synchronizing signal,
   while in a case where the synchronous processing is being performed, the control portion initializes compulsorily the parameter of the imaging portion as well as the arithmetic processing of the setting of the optical system before resuming the generation of the synchronizing signal.

2. The photographing apparatus according to claim 1, wherein the trigger input portion is operable to input an auxiliary trigger signal preceding the trigger signal, and the control portion controls photographing pre-processing in accordance with the auxiliary trigger signal to pick up a still image by the imaging portion, and when the control portion waits for the input of the trigger signal after the photographing pre-processing is terminated, the control portion controls so that at least a part of the arithmetic processing of the setting of the optical system among the synchronous processing is reduced so as to make an operation period of the synchronous processing shorter than an operation period of the synchronous processing when the photographing pre-processing is not terminated.

3. A photographing apparatus, comprising:

a synchronizing signal generation portion that outputs a synchronizing signal periodically;

an optical system;

an imaging portion that is operated based on the synchronizing signal to pick up a subject image through the optical system and generate image data;

a trigger input portion operable to input a trigger signal for commanding a start of a photographing operation by the imaging portion and an auxiliary trigger signal preceding the trigger signal; and a control portion that controls the operation of the imaging portion based on the synchronizing signal and the trigger signal, the control portion being configured to control synchronous processing performed in synchronization with the synchronizing signal, which is an arithmetic processing including at least a setting of a parameter of the imaging portion and a setting of the optical system for picking up a moving image, and photographing pre-processing that is performed in accordance with the auxiliary trigger signal to pick up a still image by the imaging portion, wherein when the control portion waits for the input of the trigger signal after the photographing pre-processing is terminated, the control portion controls so that at least a part of the arithmetic processing of the setting of the optical system among the synchronous processing is reduced so as to make an operation period of the synchronous processing shorter than an operation period of the synchronous processing when the photographing pre-processing is not terminated, and the control portion performs control so that the imaging portion starts imaging for recording when the trigger signal is input from the trigger input portion.

4. The photographing apparatus according to claim 2, wherein in a case where the photographing pre-processing is not terminated when the trigger signal is input, the control portion performs control so that the generation of the synchronizing signal is stopped after waiting for the end of the photographing pre-processing.

5. The photographing apparatus according to claim 3, wherein in a case where the photographing pre-processing is not terminated when the trigger signal is input, the control portion performs control so that the generation of the synchronizing signal is stopped after waiting for the end of the photographing pre-processing.

* * * * *